US009697498B2

(12) United States Patent
Vilnis et al.

(10) Patent No.: US 9,697,498 B2
(45) Date of Patent: Jul. 4, 2017

(54) INFERRED SALARY DISTRIBUTION FOR SCHOOLS

(71) Applicant: LinkedIn Corporation, Mountain View, CA (US)

(72) Inventors: Luke MacDonald Vilnis, Northampton, MA (US); Andrew David Blevins, Redwood City, CA (US); Gloria Lau, Los Altos, CA (US); Vitaly Gordon, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 256 days.

(21) Appl. No.: 14/339,375

(22) Filed: Jul. 23, 2014

(65) Prior Publication Data
US 2016/0026916 A1  Jan. 28, 2016

(51) Int. Cl.
G06Q 10/10 (2012.01)
G06Q 50/00 (2012.01)

(52) U.S. Cl.
CPC ............. G06Q 10/10 (2013.01); G06Q 50/01 (2013.01)

(58) Field of Classification Search
CPC ...................................................... G06Q 10/10
See application file for complete search history.

(56) References Cited

U.S. PATENT DOCUMENTS

| 8,001,057 | B1 * | 8/2011 | Hill | G06Q 10/10 705/1.1 |
| 8,494,929 | B1 * | 7/2013 | Borgen | G06Q 10/105 705/30 |
| 2003/0145015 | A1 * | 7/2003 | Turnasella | G06Q 30/0203 |
| 2004/0186852 | A1 * | 9/2004 | Rosen | G06Q 30/02 |
| 2004/0210820 | A1 * | 10/2004 | Tarr | G06Q 10/0639 715/230 |
| 2006/0212476 | A1 * | 9/2006 | Bogle | G06Q 10/06 |
| 2007/0022113 | A1 * | 1/2007 | Heino | G06Q 30/00 |
| 2007/0239468 | A1 * | 10/2007 | O'Brien | G06Q 10/10 705/30 |
| 2008/0027747 | A1 * | 1/2008 | McGovern | G06Q 10/06 705/321 |
| 2008/0147630 | A1 * | 6/2008 | Chu | G06F 17/30533 |
| 2009/0063468 | A1 * | 3/2009 | Berg | G06F 17/30864 |
| 2009/0094219 | A1 * | 4/2009 | Davis | G06Q 10/06 |
| 2010/0121858 | A1 * | 5/2010 | Goettsch | G06Q 30/02 707/748 |
| 2010/0211516 | A1 * | 8/2010 | Andrekovich | G06Q 10/10 705/321 |
| 2012/0030126 | A1 * | 2/2012 | McCagg | G06Q 10/00 705/321 |
| 2013/0097093 | A1 * | 4/2013 | Kolber | G06Q 10/1053 705/321 |

(Continued)

Primary Examiner — Huawen A Peng
(74) Attorney, Agent, or Firm — Schwegman Lundberg & Woessner, P.A.

(57) ABSTRACT

Systems, methods and a machine-readable media are described herein for a salary range engine to identify at least one attribute of a first member profile from a plurality of member profiles of a social networking service. The salary range engine correlates the at least one attribute with respect to at least a portion of trained salary data in a trained salary data repository. The salary range engine infers a target salary range based on a correlation between the at least one attribute of the first member profile and at least the portion of the trained salary data.

15 Claims, 5 Drawing Sheets

(56) References Cited

U.S. PATENT DOCUMENTS

| | | | |
|---|---|---|---|
| 2014/0032382 A1* | 1/2014 | Hamann | G06Q 10/1091 705/32 |
| 2014/0289142 A1* | 9/2014 | Gu | G06Q 10/1053 705/321 |
| 2015/0046356 A1* | 2/2015 | Millmore | G06Q 10/1053 705/321 |
| 2015/0347973 A1* | 12/2015 | Singh | G06Q 10/1053 705/321 |

* cited by examiner

INFERRED SALARY DISTRIBUTION FOR SCHOOLS

TECHNICAL FIELD

The present disclosure generally relates to data processing systems. More specifically, the present disclosure relates to methods, systems and computer program products for inferring a salary range for at least one member of a professional social networking service.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

Figure 1:
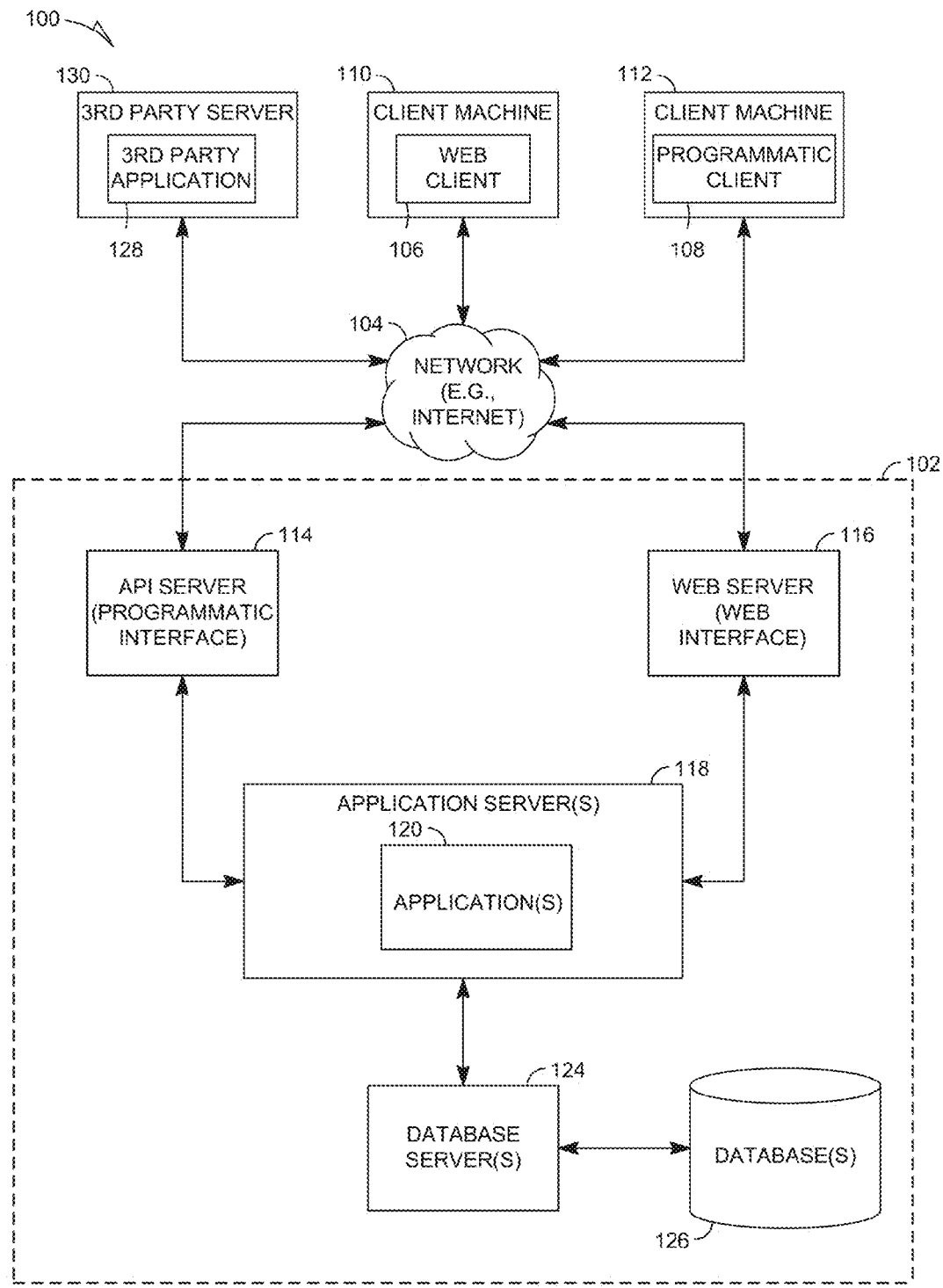
FIG. 1 is a block diagram illustrating a client-server system, in accordance with an example embodiment.

The present disclosure describes methods and systems for inferring a salary range for a member of a professional social networking service. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Consistent with embodiments of the invention, and as described in detail herein, a professional social networking service (hereinafter "social network" or "social network service") includes the necessary logic for a salary range engine to identify at least one attribute of a first member profile from a plurality of member profiles in a social networking service. The salary range engine correlates the at least one attribute of the first member profile with respect to at least a portion of trained salary data in a trained salary data repository. In some embodiments, the trained salary data is derived from processing a set of data with a machine learning algorithm, where the set of data comprises known salaries for a set of members. The salary range engine infers a target salary range based on a correlation between the at least one attribute of the first member profile and at least the portion of the trained salary data.

In various embodiments, one or more attributes of a member profile may be: an industry, a job title, a geographic location, a measure of educational attainment, professional seniority, job function, member skills, employer(s) size and a supervisor's title. In some embodiments, an attribute may be provided to a member profile from a member of the social networking service. In other embodiments, an attribute may be derived based on other attributes of a member profile.

In various embodiments, one or more attributes of the first member profile may be selected by the first member or may be provided to the first member profile by other members of the social network. For example, other members of the social network may rate (i.e. endorse) one or more attributes of the first member profile. Such ratings or endorsements by the other members may be considered by the salary range engine in order to infer the target salary range for the first member.

In some embodiments, one or more attributes of the first member profile can be represented in accordance with a degree of strength. The degree of strength, for example, describes the first member's aptitude with respect to the attribute. In other embodiments, one or more attributes of the first member profile may be represented in accordance with a particular level of skill the first member has with respect to an attribute (such as a job function) of the first member profile. One or more degrees of strength and one or more levels of skill may be considered by the salary range engine in order to infer the target salary range for the first member.

The trained salary data includes salary statistics based on actual salaries of various professionals. The salary statistics correspond to various attributes of each respective professional represented in a trained salary data repository. The attributes of the respective professionals influence a placement of an amount of the professional's actual salary over a statistical distribution of actual salary values. The salary range engine accesses the trained salary data and identifies attributes in the trained salary data that correspond to (or are similar to) the at least one attribute of the first member profile. The salary range engine infers what the first member's salary should be based on a correlation between the attributes of the first member profile and the various attributes of the respective professionals represented in the trained salary data repository. The target salary range inferred by the salary range engine represents a salary range within which an actual salary of the first member should be based on the correlation.

In some embodiments, the target salary range may represent a salary range within which an actual salary of the first member should be due to one or more educational institutions described on the first member profile. In other embodiments, the target salary range may represent a salary range within which an actual salary of the first member should be due to a measure of professional seniority described by the first member profile. The measure of professional seniority may be based on an aggregation of the various job titles listed on the first member profile and a number of years the first member profile indicates that the first member has been under employment with various employers.

In other embodiments, after the salary range engine generates the inferred salary range for the first member, the salary range engine may use the inferred salary range for the first member to further train the trained salary data in the trained salary data repository.

FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a social network service.

Figure 2:
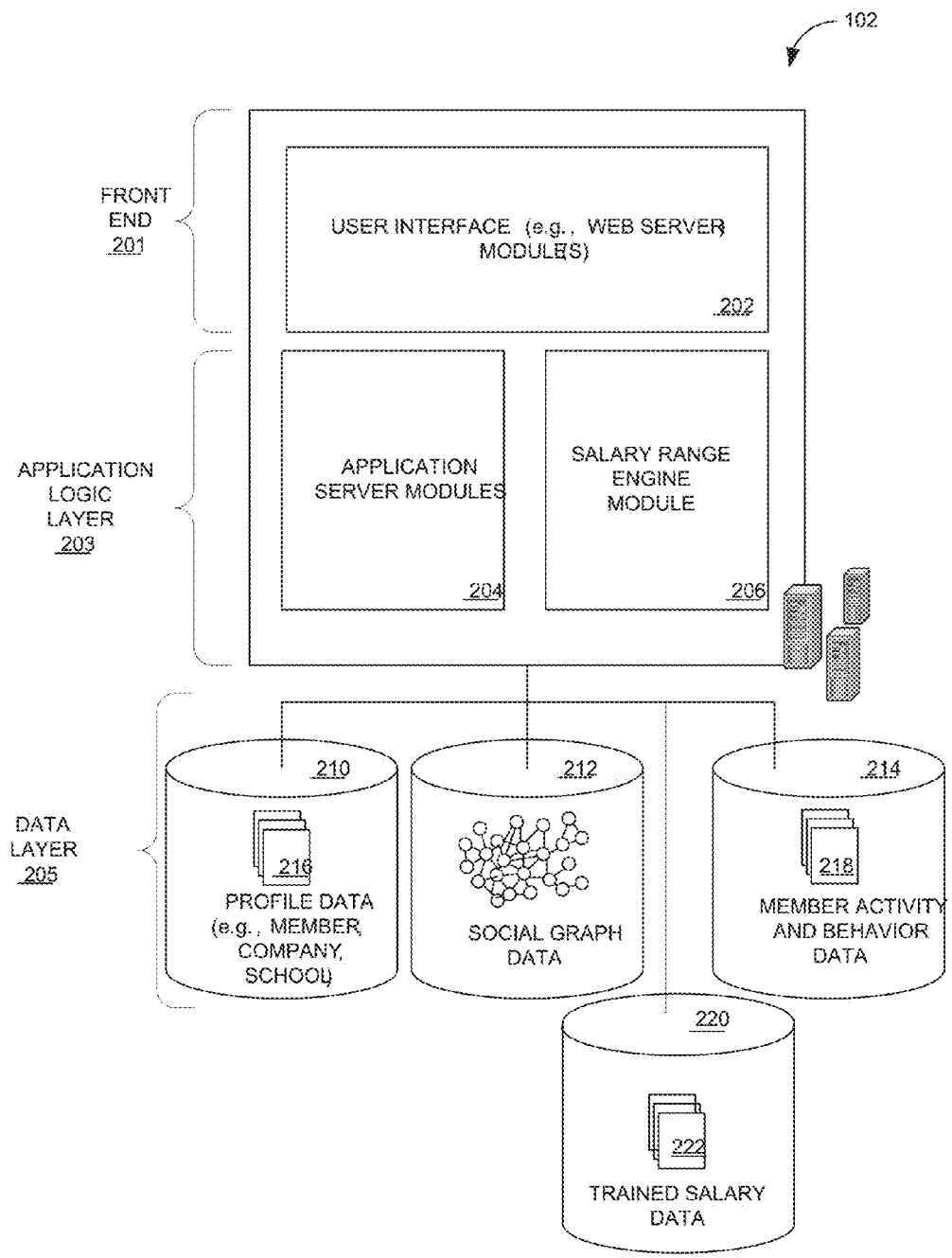
FIG. 2 is a block diagram showing the functional components of a social network service within a networked system, in accordance with an example embodiment.

FIG. 2 is a block diagram showing functional components of a social network service within the networked system 102, in accordance with an example embodiment. As shown in FIG. 2, the social network service may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a social network system, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a social network service is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the social network service. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the social network service, the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the social network service. These settings may comprise various categories, including, but not limited to, privacy and communications. Each category may have its own set of settings that a member may control.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behaviour (e.g., content viewed, links or member-interest buttons selected, etc.) may be monitored and information 218 concerning the member's activities and behaviour may be stored, for example, as indicated in FIG. 2, by the database 214. This information 218 may be used to classify the member as being in various categories. For example, if the member performs frequent searches of job listings, thereby exhibiting behaviour indicating that the member is a likely job seeker, this information 218 can be used to classify the member as a job seeker. This classification can then be used as a member profile attribute for purposes of enabling others to target the member for receiving messages or status updates.

The data layer 205 further includes a trained salary data repository 220 which includes trained salary data 222. The trained salary data 222 includes actual salary values of various professionals. Each actual salary value in the trained salary data 222 is associated with at least one attribute of each respective professional. Such attributes in the trained salary data 222 exist in a statistical relationship with an actual salary value to signify how such attributes result in a professional receiving the actual salary value. The trained salary data 222 further includes a distribution of salary values of various professionals represented in the trained salary data 222. In some embodiments, the distribution of salary values may be specific to one or more industries, job titles, job functions, geographic locations, professional seniority, educational institutions and the like.

In some embodiments, the social network service provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., a smartphone, or tablet computing devices) having a mobile operating system.

The data and information (e.g., profile data 216, member activity and behaviour data 218, trained salary data 222) in the data layer 205 may be accessed, used, and adjusted by the salary range engine module 206 as will be described in more detail below in conjunction with FIGS. 3-4. Although the salary range engine module 206 is referred to herein as being used in the context of a social network service, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure.

Figure 3:
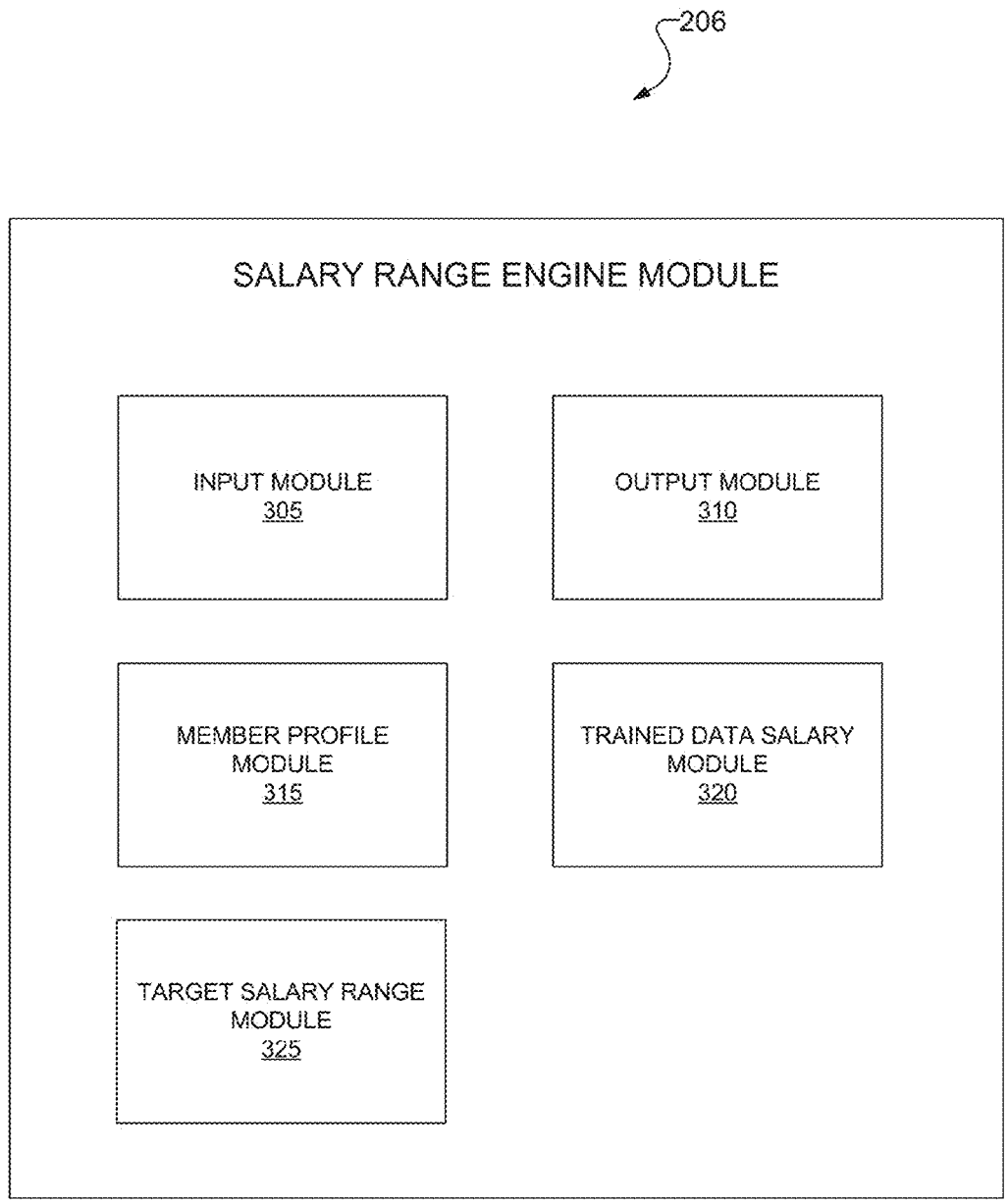
FIG. 3 is a block diagram showing example components of a salary range engine, according to some embodiments.

FIG. 3 is a block diagram showing example components of a salary range engine, according to some embodiments.

The input module 305 may be a hardware-implemented module which may receive and process any inputs from one or more components of system 102 as illustrated in FIG. 1 and FIG. 2. The inputs may include requests for an inferred target salary range(s), requests to train a portion of trained salary data 222 with an inferred target salary range, and the like.

The output module 310 may be a hardware-implemented module which may send any outputs to one or more components of system 100 of FIG. 1 (e.g., one or more client devices 110, 112, third party server 130, etc.). The outputs may include a target salary range for one or members of the social network. The member profile module 315 may be a hardware-implemented module which may manage, facilitate, and control access of profile data 216 in database 210. For example, when a request for an inferred salary range is received from one or more client devices 110, 112, the member profile module 315 accesses the database 210 in order to identify one or more attributes of member profiles associated with the requests sent from the one or more client devices 110, 112.

The trained data salary module 320 may be a hardware-implemented module which may manage, control, store, and access information associated with trained salary data 222. The information may be stored in and accessed from the trained salary data repository 220 shown in FIG. 2. The information managed by the trained data salary module 320 may include any information associated with actual salary values of various professionals represented in the trained salary data 222. Moreover, the trained salary data 222 includes statistical data representing how various attributes of the professionals represented in the trained salary data 222 influence a likelihood of receiving a particular actual salary amount.

The target salary range module 325 may be a hardware-implemented module which may correlate one or more attributes of a member profile in the social network with one or more attributes of professional represented in the trained salary data 222. Based on the correlation, the target salary range module 325 infers a target salary range for one or more members in the social network. The target salary range represents a salary range within which an actual salary of a member of the social network should be based on a correlation of the at least one attribute of the member's profile to at least one corresponding attribute in the trained salary data 222.

Figure 4:
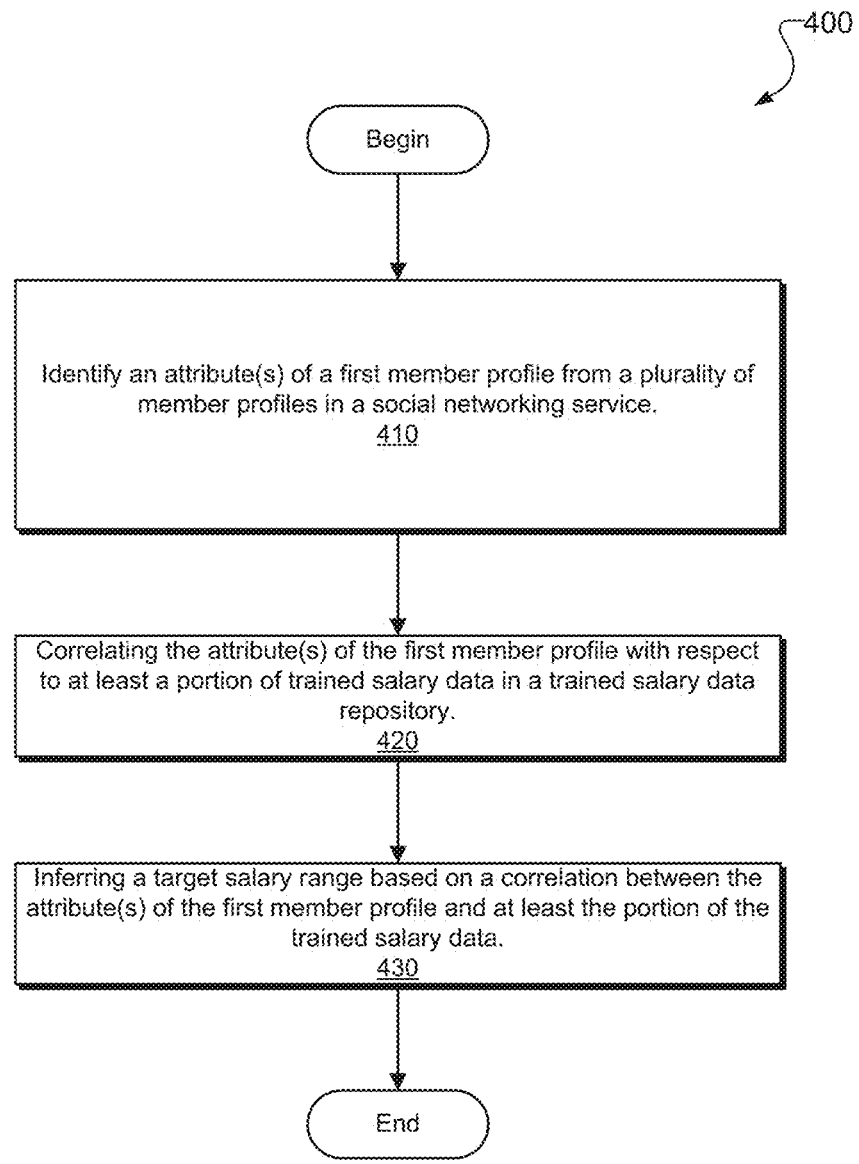
FIG. 4 is a flowchart illustrating a method of inferring a target salary range, in accordance with an example embodiment.

FIG. 4 is a flowchart illustrating a method 400 of inferring a target salary range, in accordance with an example embodiment.

At operation 410, a salary range engine 206 identifies at least one attribute of a first member profile from a plurality of member profiles in a social networking service. For example, the salary range engine 206 may identify at least one industry associated with the first member profile, at least one job title in the first member profile, at least one geographic location in the first member profile, at least one measure of educational attainment described in the first member profile, at least one level of professional seniority described in the first member profile, at least one job function described in the first member profile, at least one skill described in the first member profile, at least one measure of strength of at least one skill described in the first member profile, at least one size of at least one employer in the first member profile and at least one title of a supervisor of the first member.

At operation 420, the salary range engine 206 correlates the at least one attribute of the first member profile with respect to at least a portion of trained salary data in a trained salary data repository. The trained salary data comprises statistical information about actual salaries of a plurality of professionals. Each respective professional represented in the trained salary data repository is associated (implicitly or explicitly) with various professional attributes that have been determined to influence the respective professional's actual salary.

At operation 430, a salary range engine 206 infers a target salary range based on a correlation between the at least one attribute of the first member profile and at least the portion of the trained salary data. The salary range engine 206 identifies actual salary values that are statistically related to professional attributes in the trained salary data, where the professional attributes also correspond to the attributes in the first member profile. The salary range engine 206 creates a target salary range based on the identified actual salary values. In some embodiments, the target salary range may represent a salary range within which an actual salary of the first member should be based at least on an educational institution described in the first member profile and a measure of professional seniority described in the first member profile.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 5:
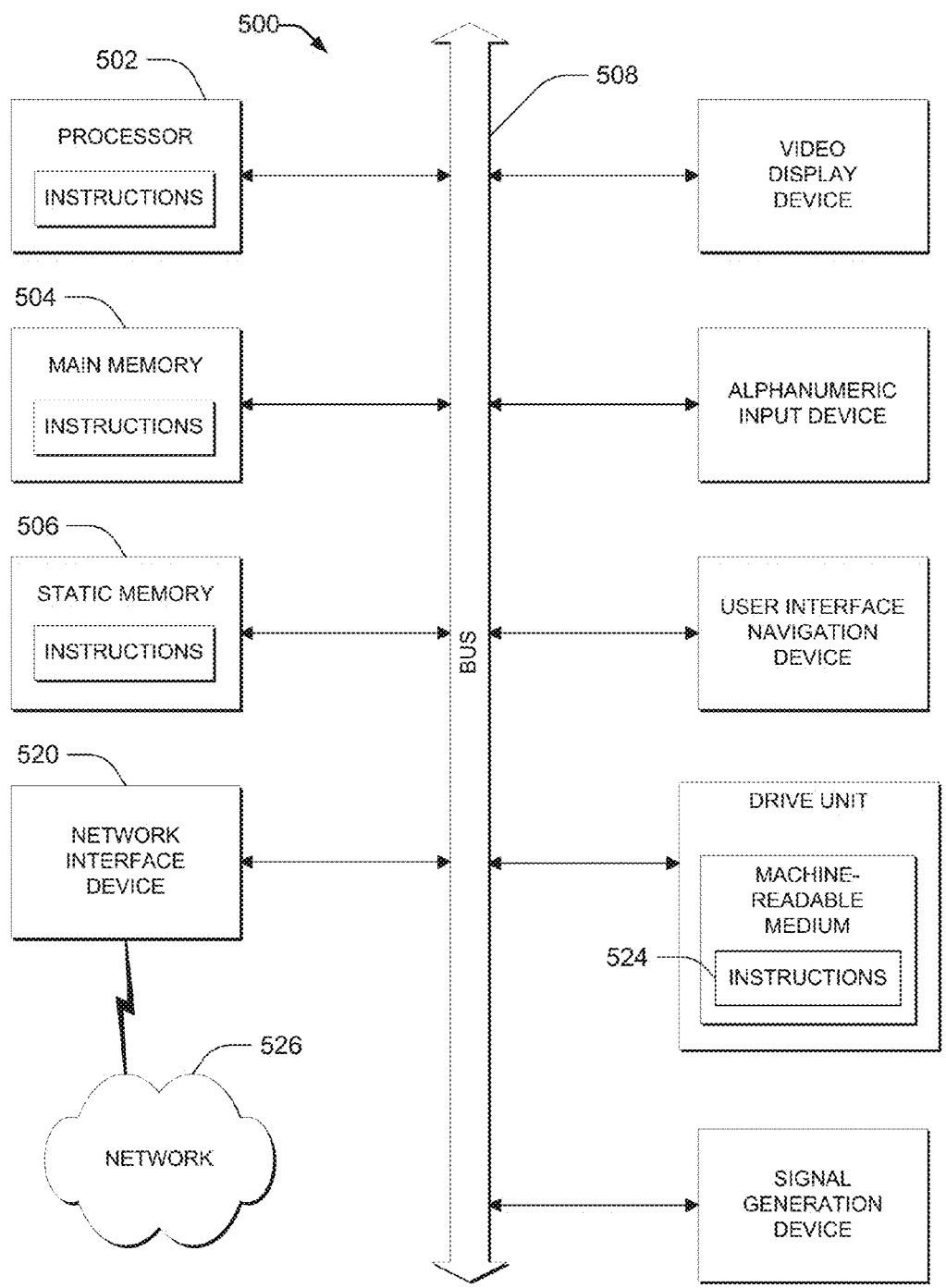
FIG. 5 is a block diagram of an example computer system on which methodologies described herein may be executed, in accordance with an example embodiment.

FIG. 5 is a block diagram of a machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes a processor 502 (e.g., a central processing unit (CPU), a graphics processing unit (GPU) or both), a main memory 504, and a static memory 506, which communicate with each other via a bus 508. Computer system 500 may further include a video display device 510 (e.g., a liquid crystal display (LCD) or a cathode ray tube (CRT)). Computer system 500 also includes an alphanumeric input device 512 (e.g., a keyboard), a user interface (UI) navigation device 514 (e.g., a mouse or touch sensitive display), a disk drive unit 516, a signal generation device 518 (e.g., a speaker) and a network interface device 520.

Disk drive unit 516 includes a machine-readable medium 522 on which is stored one or more sets of instructions and data structures (e.g., software) 524 embodying or utilized by any one or more of the methodologies or functions described herein. Instructions 524 may also reside, completely or at least partially, within main memory 504, within static memory 506, and/or within processor 502 during execution thereof by computer system 500, main memory 504 and processor 502 also constituting machine-readable media.

While machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 524 may further be transmitted or received over a communications network 526 using a transmission medium. Instructions 524 may be transmitted using network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   generating trained salary data for a database based on inputting a set of data into a machine learning algorithm, the set of training data comprising a set of member profiles attributes of a plurality of member profiles in a social networking service and a known salary amount for each member profile in the set of data;
   identifying for each type of member profile attribute, via the machine learning algorithm, a statistical likelihood that a respective type of member profile attribute is correlated with a particular salary range, wherein a first type of member profile attribute comprises a specific job title of a supervisor of a member profile having a social network connection with a given member profile, the statistical likelihood based on the known salary amounts of each member profile in the set of data and a job title of a supervisor of a member profile having a social network connection with a respective member profile in the set of data;
   indentifying an instance of the first type of member profile attribute of a first member profile from a plurality of member profiles in the social networking service; and
   inferring a target salary range of the first member based at least on a correlation in the trained salary data between the instance of the first type of member profile attribute of the first member profile and the known salary amounts of each member profile in the set data.

2. The computer-implemented method of claim 1, wherein a second type of member profile attributed comprises: a specific job title of the given member profile.

3. The computer-implemented method of claim 2, wherein a third type of member profile attribute comprises: a specific geographic locations of the given profile.

4. The computer-implemented method of claim 3, wherein a fourth type of member profile attribute comprises: a specific type of professional skill listed in the given member profile.

5. The computer-implemented method of claim 4, wherein one or more respective additional types of members profile attributes comprise:
   identifying at least one of:
   a) a specific industry associated with the given member profile;
   b) a specific educational degree described in the given member profile;
   c) a specific level of professional seniority described in the given member profile;
   d) a specific job function described in the given member profile;
   e) a specific measure of strength of at least one skill described in the given member profile; and
   f) a specific employer size range of a respective employer in the given member profile.

6. A non-transitory computer-readable medium storing executable instructions thereon, which, when executed by a processor, cause the processor to perform operations including:
   generating trained salary data for a database based on inputting a set into a machine learning algorithm, the set of training data comprising a set of member profiles attributes of a plurality of member profiles in a social networking service and a known salary amount for each member profile in the set of data;

identifying for each type of member profile attribute, via the machine learning algorithm, a statistical likelihood that a respective type of member profile attribute is correlated with a particular salary range, wherein a first type of member profile attribute comprises a specific job title of a supervisor of a member profile having a social network connection with a given member profile, the statistical likelihood based on the known salary amounts of each member profile in the set of data and a job title of a supervisor of a member profile having a social network connection with a respective member profile in the set of data;

identifying an instance of the first type of member profile attribute of a first member profile from a plurality of member profiles in the social networking service; and inferring a target salary range of the first member profile based at least on a correlation in the trained salary data between the instance of the fist type of member profile attributes of the first member profile and the known salary amounts of each member profile in the set of data.

7. The new transitory computer-readable medium of claim 6, wherein a second type of member profile attribute comprises: a specific job title of the given member profile.

8. The non-transitory computer-readable medium of claim 7, wherein a third type of member profile attribute comprises: a specific geographic location of the given member profile.

9. The non-transitory computer-readable medium of claim 8, wherein a fourth type of member profile attribute comprises: a specific type of professional skill listed in the given member profile.

10. The non-transitory computer-readable of claim 9, wherein one or more respective additional types of member profile attributes comprise:

identifying at least one of:
a) a specific industry associated with the given member profile;
b) a specific educational degree described in the given member profile;
c) a specific level of professional seniority described in the given member profile;
d) a specific job function described in the given member profile;
e) a specific measure of strength of at least one skill described in the given member profile; and
f) a specific employer size range of a respective employer in the given member profile.

11. A computer system comprising:
a processor;
a memory device holding an instruction set executable on the processor to cause the computer system to perform operations comprising:
generating trained salary data for a database based on inputting a set into a machine learning algorithm, the set of training data comprising a set of member profiles attributes of a plurality of member profiles in a social networking service and a known salary amount for each member profile in the set of data;
indentifying for each type of member profile attribute, via the machine learning algorithm, a statistical likelihood that a respective type of member profile attribute is correlated with a particular salary range, wherein a first type of member profile attribute comprises a specific job title of a supervisor of a member profile having a social network connection with a given member profile,
the statistical likelihood based on the known salary amounts of each member profile in the set of data and a job title of a supervisor of a member profile having a social network connection with a respective member profile in the set of data;
identifying an instance of the first type of member profile attribute of a first member profile from a plurality of member profiles in the social networking service; and
inferring a target salary range of the first member profile based at least on a correlation in the trained salary data between the instance of the fist type of member profile attributes of the first member profile and the known salary amounts of each member profile in the set of data.

12. The computer system of claim 11, wherein a second type a member profile attribute comprises: a specific job title of the given member profile.

13. The computer system of claim 12, wherein a third type of member profile attribute comprises: a specific geographic location of the given member profile.

14. The computer system of claim 13, wherein a fourth type of member profile attribute comprises: a specific type of professional skill listed in the given member profile.

15. The computer system of claim 14, wherein one or more respective additional types of member profile attributes comprise:
identifying at least one of:
a) a specific industry associated with the given member profile;
b) a specific educational degree described in the given member profile;
c) a specific level of professional seniority described in the given member profile;
d) a specific job function described in the given member profile;
e) a specific measure of strength of at least one skill described in the given member profile; and
f) a specific employer size range of a respective employer in the given member profile.

* * * * *

UNITED STATES PATENT AND TRADEMARK OFFICE
CERTIFICATE OF CORRECTION

PATENT NO.      : 9,697,498 B2
APPLICATION NO. : 14/339375
DATED           : July 4, 2017
INVENTOR(S)     : Vilnis et al.

It is certified that error appears in the above-identified patent and that said Letters Patent is hereby corrected as shown below:

In the Claims

In Column 12, Line 28, in Claim 1, delete "indentifying" and insert --identifying-- therefor In Column 12, Line 31, in Claim 1, after "member", insert --profile--

In Column 12, Line 35, in Claim 1, after "set", insert --of--

In Column 12, Line 37, in Claim 2, delete "attributed" and insert --attribute-- therefor In Column 12, Line 41, in Claim 3, delete "locations" and insert --location-- therefor In Column 12, Line 41, in Claim 3, after "given", insert --member--

In Column 12, Line 47, in Claim 5, delete "members" and insert --member-- therefor In Column 12, Line 67, in Claim 6, after "set", insert --of data--

In Column 13, Line 23, in Claim 6, delete "fist" and insert --first-- therefor

In Column 13, Line 24, in Claim 6, delete "attributes" and insert --attribute-- therefor In Column 13, Line 27, in Claim 7, delete "new transitory" and insert --non-transitory-- therefor In Column 13, Line 39, in Claim 10, after "computer-readable", insert --medium--

In Column 14, Line 7, in Claim 11, after "set", insert --of data--

In Column 14, Line 11, in Claim 11, delete "indentifying" and insert --identifying-- therefor Signed and Sealed this
Tenth Day of April, 2018

Andrei Iancu
*Director of the United States Patent and Trademark Office*

CERTIFICATE OF CORRECTION (continued)
U.S. Pat. No. 9,697,498 B2

In Column 14, Line 27, in Claim 11, delete "fist" and insert --first-- therefor

In Column 14, Line 28, in Claim 11, delete "attributes" and insert --attribute-- therefor In Column 14, Line 32, in Claim 12, delete "a" and insert --of-- therefor